Patented Sept. 17, 1946

2,407,962

UNITED STATES PATENT OFFICE 2,407,962

MOLDING CELLULOSE ESTER COMPOSITIONS

Howard K. Nason, Springfield, Mass., assignor to Monsanto Chemical Company, St. Louis, Mo., a corporation of Delaware No Drawing. Application March 24, 1944, Serial No. 527,959

8 Claims. (Cl. 18—55)

This invention relates to a method of making homogeneous, strain-free, compression molded cellulose ester plastic articles.

According to prior processes, cellulose ester plastic compositions are compression molded by placing the plastic material in a mold, subjecting the plastic to pressure and thereafter, or simultaneously, rapidly heating the mold to a temperature equal to or above the minimum temperature necessary for producing a homogeneous product and maintaining the mold at such a temperature until the entire mass reaches the conversion temperature. It has been found that in following such prior processes in molding thick masses of cellulose ester compositions, for example, in producing articles having a thickness greater than one inch the molded products are strained and non-uniform in properties. A particular example of the above mentioned prior processes is the well known baking of cellulose ester plastic compositions whereby blocks of plastic materials from 2 to 6 inches in thickness are produced. Thus, it is found that sheets sliced from such prior plastic blocks are non-uniform in physical properties and there is excessive degradation and/or decomposition of the outer portions.

According to the present invention, cellulose ester plastic compositions are compression molded into articles of substantial thickness, for example, about one inch and over, while maintaining a temperature gradient of not over about 30° F. within the plastic mass during the heating thereof after the temperature of any portion of the plastic mass reaches about 150–160° F. By operating in this manner it is found that molded products are produced which are uniform in physical and chemical characteristics.

According to one embodiment of this invention, a cellulose ester plastic composition in the form of powder, slabs, blocks, etc., is placed in a mold and suitable pressure, for example, 100–500 pounds per square inch applied. Thereafter the mold is heated to raise the temperature of the plastic and after the temperature of the outer portions of the plastic reaches about 150° F., further rise in temperature is prevented by proper adjustment of the mold temperature until the temperature in the central portion of the plastic reaches about 120° F. or above. Thereafter, the temperature of the mold is raised continuously, or in steps, at a rate corresponding to the rise in temperature of the central portion of the plastic while maintaining a temperature gradient within the plastic mass of not over about 30° F. and preferably from 15–30° F. In a stepwise heating process, for example, as the temperature of the central portion of the plastic approaches that of the outer portions, e. g., within 5–10° F. the temperature of the mold is raised to establish a temperature gradient of not over 30° F. within the plastic mass. As the temperature of the central portion of the plastic again approaches that of the outer portions, the mold temperature is again raised to re-establish the temperature gradient within the plastic. The above-mentioned continuous or step-wise heating process is continued until the temperature of the central portion of the mass (or of the portion of the mass showing the lowest temperature), reaches its conversion temperature whereupon the mold temperature is held stationary for a short period of time. Thus, for example, in the case of plasticized cellulose acetate from 1 to 15 minutes is sufficient to bring about complete unification of the plastic.

While the central portion of the plastic has been used as a reference point in setting forth the temperature gradient in the above description, it is to be understood that when the plastic article to be formed is of such a shape or the mold heating conditions are of such a nature that some other portion of the interior of the plastic than the center thereof shows the greatest temperature lag, such a point in the plastic should be used as the reference point.

The minimum temperature to which the plastic is heated is generally the temperature at which the particular composition is converted from discontinuous masses of plastic, for example, particles, slabs, blocks, etc., into a unitary, homogeneous product at the particular pressure employed. In the case of most cellulose ester plastic compositions, this is between about 180° F. and 350° F.

By operating in the manner described above, it is found that compression molded articles possessing substantial thickness, for example in excess of about one inch, which are homogeneous and uniform in their chemical and physical characteristics may be produced from cellulose ester plastic compositions.

When desired, the plastic may be heated throughout the molding operation according to the procedure described above, but in order to insure a uniform product, it is essential that the above procedure be followed after the maximum temperature in the plastic reaches about 150–160° F.

It is also found desirable to reduce the temperature of the molded plastic by the method described above for bringing the temperature of the plastic up to its temperature of conversion, that is, the mold is cooled at such a rate that a temperature gradient of not over about 30° F. is maintained within the plastic by proper control of the mold temperature. Thus, it is found that by cooling the molded article in this manner, strains are avoided which result from rapid cooling.

The cellulose ester compositions which are molded according to this invention may be in the form of powder, slabs, blocks or other physical configuration. These compositions may contain plasticizers, fillers, pigments, dyes, volatile solvents, and/or other ingredients needed to give the molded articles the desired physical characteristics for further processing or ultimate use.

The nature of the plasticizers, solvents or other modifiers or effect materials employed depend on the particular cellulose ester employed and the nature of the product desired. As examples of plasticizers, particularly for use with cellulose acetate, may be mentioned aryl sulphonamides such as para ethyl toluol sulphonamide, alkyl phthalates such as dimethyl phthalate, alkyl tartrates such as dibutyl tartrate, alkoxy esters of polybasic organic acids such as diethoxy ethyl phthalate, aryl esters of phosphoric acid such as triphenyl phosphate, and alkyl esters of phthalyl glycollic acid such as ethyl phthalyl ethyl glycollate. When desired, mixtures of plasticizers may be employed.

The amount of plasticizer used may be widely varied depending on the nature of the base material and the product desired. For example, in general from 10 to 90 parts of plasticizer are used for every 100 parts of cellulose ester.

This invention is applicable, in general, to the molding of thick sections of cellulose ester plastic compositions and particularly, to the molding of plastic compositions comprising organic esters of cellulose such as cellulose acetate which are especially susceptible to degradation and/or decomposition when subjected for long periods of time to the temperatures necessary to convert the crude plastic into a unitary, homogeneous article.

As examples of cellulose ester plastic compositions, to which the process of this invention is applicable, are plastic compositions having as a base cellulose acetate, cellulose nitrate, cellulose aceto-butyrate, cellulose propionate-butyrate and the like.

The nature of the cellulose ester employed may be substantially varied, for example, as regards acyl content when organic esters of cellulose are used, for example, cellulose acetate having an acetyl content between 35 and 39% may be used.

The cellulose acetate employed in Examples 1 and 2 has an acetyl content of 38.5%.

The following examples exemplify the present invention. Where parts are given, they are parts by weight.

*Example 1*

A composition comprising 100 parts of cellulose acetate, 36.5 parts of diethyl phthalate and 84 parts of a volatile solvent mixture comprising ethanol and acetone, is prepared in slab form for the so-called baking step wherein a solid, uniform block of plastic is prepared for slicing in a manner well known to those skilled in the art. Thus, the above ingredients may be mixed in a Banbury mixer and further homogenized and excess solvent removed on mixing rolls to form slabs of the plastic composition which still contain a substantial amount of a volatile solvent, for example, up to about 25%. Slabs of this material heated to 120° F., and in sufficient amount to produce a block two inches thick are placed in an open mold which measures 18" x 20" in inside dimensions and comprises a support and side rails cooperating with an hydraulic piston head. The support, side rails and piston head of the mold are equipped with a steam jacket whereby the mold may be heated to the desired temperature. A thermocouple is inserted into the center of the plastic and connected to a galvanometer by means of which the temperature of the center of the plastic is determined. 170 pounds pressure per square inch is applied to the plastic by means of the piston head. The mold is then heated to 140° F., i. e. 20° F. above the temperature of the plastic. Thereafter, the mold temperature is increased in 20° F. increments at 15-minute interval whereby the mold temperature is kept not more than 30° F. higher than the temperature at the center of the plastic.

A mold temperature of 290° F. is reached in 2 hours, at which time the temperature at the center of the plastic is 280° F. After about 1 minute at this temperature, the mold is cooled to about 260° F. and thereafter the temperature of the mold is lowered about 20° F. every 15 minutes until the center of the plastic is cooled to about 120° F. The resulting product is a homogeneous, optically clear block of plastic, free from poorly molded spots and internal stresses as indicated by examination under a polariscope. Furthermore, there are no indications of decomposition, i. e., no discoloration or odor of acetic acid.

In contrast to the foregoing, a block of similar plastic of similar size is molded by heating the mold to 290° F. within a few minutes and maintained at that temperature for 2 hours. The temperature of the center of the plastic is found to be 280° F. at the end of this heating period. Thereafter, the mold is quickly chilled with cold water to cool the plastic. The product shows internal stresses, particularly near the surfaces when examined under polarized light and the presence of acetic acid near the surface is detected. Furthermore, the molded product possesses poor physical properties.

In further contrast to Example 1, a block of similar plastic of similar size is molded by heating the mold to 220° F. within a few minutes and maintained at that temperature for two hours. The temperature of the center of the plastic is found to be 160° F. at the end of this heating period. The product is removed after cooling and is found to possess internal stresses when examined under a polariscope.

*Example 2*

A plastic composition comprising 100 parts of cellulose acetate, 20 parts of dimethyl phthalate and 20 parts of triphenyl phosphate is formed into a molding powder and molded as in Example 1 into a block of plastic approximately 18 inches by 20 inches by 2 inches (18" x 20" x 2") in dimension. The initial temperature of the plastic is 80° F. 150 pounds per square inch pressure is applied to the plastic and thereafter the temperature of the mold is raised about 20° F. every 15 minutes from an initial temperature of 80° F., the temperature gradient within the plastic thereby not exceeding 30° F. At the end of 3¼ hours the mold temperature is 360° F. and the center of the block is 340° F.

The temperature of the mold is maintained at 360° F. for 15 minutes and thereafter cooled while maintaining a 30° F. gradient between the center of the plastic and the mold until a temperature is reached at which the plastic can be removed from the mold without injury. The product possesses physical properties similar to those of the product in Example 1.

Cellulose ester plastic blocks having greater thickness, for example, 4-6 inches, may be baked according to this invention with improved results over the prior methods comparable to those set forth in Examples 1 and 2.

What is claimed is:

1. In a process of molding thick masses of cellulose ester plastic compositions wherein the plastic is heated above about 150° F., the steps which comprise placing the plastic material in a mold, the temperature of both the plastic and the mold being not over about 150° F., raising the temperature of all portions of the plastic above 150° F., by raising the temperature of the mold, the rate of increase of the mold temperature being such that a temperature gradient of not over about 30° F. is produced within the plastic mass before the temperature of any portion of the plastic goes above about 150° F. and a temperature gradient of not over about 30° F. is thereafter maintained within the plastic.

2. In a process of molding thick masses of cellulose ester plastic compositions wherein the plastic is heated above about 150° F., the steps which comprise placing the plastic material in a mold, the temperature of both the plastic and the mold being not over about 150° F., raising the temperature of all portions of the plastic above 150° F., by raising the temperature of the mold, the rate of increase of the mold temperature being such that a temperature gradient of 15-30° F. is produced within the plastic mass before the temperature of any portion of the plastic goes above 150° F. and a temperature gradient of 15-30° F. is thereafter maintained within the plastic.

3. The process defined in claim 1 in which the cellulose ester is cellulose acetate.

4. The process defined in claim 1 in which the cellulose ester is cellulose nitrate.

5. In the process of molding cellulose ester plastic compositions having a thickness of at least one inch, wherein the plastic is heated above about 150° F., the steps which comprise placing the plastic in a mold, the temperature of both the plastic and the mold being not over about 150° F., raising the temperature of all portions of the plastic above 150° F. by raising the temperature of the mold, the rate of increase of the mold temperature being such that a temperature gradient of not over about 30° F. is set up within the plastic mass before the temperature of any portion of the plastic mass goes above about 150° F. and a temperature gradient of not over about 30° F. is thereafter maintained within the plastic, continuing to increase the temperature of the mold until the desired minimum temperature is attained at the point of greatest temperature lag within the plastic, maintaining the mold at the attained temperature for a relatively short period of time, and then lowering the temperature of the plastic to the desired minimum temperature by lowering the temperature of the mold, the rate of decrease in the mold temperature being such that a temperature gradient of not over about 30° F. is set up within the plastic mass.

6. In the process of molding cellulose ester plastic compositions having a thickness of at least one inch, wherein the plastic is heated above about 150° F., the steps which comprise placing the plastic in a mold, the temperature of both the plastic and the mold being not over about 150° F., raising the temperature of all portions of the plastic above 150° F. by raising the temperature of the mold, the rate of increase of the mold temperature being such that a temperature gradient of 15-30° F. is set up within the plastic mass before the temperature of any portion of the plastic mass goes above about 150° F. and a temperature gradient of 15-30° F. is thereafter maintained within the plastic, continuing to increase the temperature of the mold until the desired minimum temperature is attained at the point of greatest temperature lag within the plastic, maintaining the mold at the attained temperature for a relatively short period of time, and then lowering the temperature of the plastic to the desired minimum temperature by lowering the temperature of the mold, the rate of decrease in the mold temperature being such that a temperature gradient of 15-30° F. is set up within the plastic mass.

7. The process defined in claim 5 in which the cellulose ester is cellulose acetate.

8. The process defined in claim 6 in which the cellulose ester is cellulose acetate.

HOWARD K. NASON.